United States Patent
Kardos et al.

(10) Patent No.: US 11,347,004 B2
(45) Date of Patent: May 31, 2022

(54) SUBMARINE OPTICAL SYSTEM WITH FREE SPACE OPTICAL ADD/DROP MULTIPLEXER

(71) Applicant: Neptune Subsea IP Limited, London (GB)

(72) Inventors: Grant Kardos, Chelmsford (GB); Ian Wood, Chelmsford (GB)

(73) Assignee: Neptune Subsea IP Limited, London (GB)

( * ) Notice: Subject to any disclaimer, the term of this patent is extended or adjusted under 35 U.S.C. 154(b) by 64 days.

(21) Appl. No.: 17/009,539

(22) Filed: Sep. 1, 2020

(65) Prior Publication Data

US 2020/0400889 A1   Dec. 24, 2020

Related U.S. Application Data

(63) Continuation of application No. PCT/GB2019/050626, filed on Mar. 6, 2019.

(30) Foreign Application Priority Data

Mar. 6, 2018 (GB) ..................... 1803543

(51) Int. Cl.
*G02B 6/293* (2006.01)
*G02B 6/38* (2006.01)
(Continued)

(52) U.S. Cl.
CPC ....... *G02B 6/29383* (2013.01); *G02B 6/3887* (2013.01); *G02B 6/4427* (2013.01);
(Continued)

(58) Field of Classification Search
CPC .............. G02B 6/29383; G02B 6/3887; G02B 6/4427; G02B 6/4446; G02B 6/506;
(Continued)

(56) References Cited

U.S. PATENT DOCUMENTS 4,662,002 A * 4/1987 Davis ..................... H02G 15/14
174/70 S
4,678,270 A * 7/1987 Gunn ..................... H02G 15/14
385/138
(Continued)

FOREIGN PATENT DOCUMENTS

EP       1471670 A2    10/2004
JP    2004-072604 A    3/2004
(Continued)

OTHER PUBLICATIONS

"Recent and Future Developments in Jointing Technology in the Undersea Telecommunications Industry", Universal Jointing Consortium, Nov. 17, 2016, 4 pages.
(Continued)

*Primary Examiner* — Andrew Jordan

(57) ABSTRACT

A common component assembly is provided for a cable joint for joining a first submarine optical cable and a second submarine optical cable. The assembly includes a first end face including a first opening and a first flange for connection to a first cable termination unit of an undersea optical cable joint. The assembly also includes a second end face including a second opening and a second flange for connection to a second cable termination unit of an undersea optical cable joint. The assembly further includes a fiber tray connecting the first end face to the second end face. In addition, the assembly includes an optical assembly connected to a first side of the fiber tray. The optical assembly includes a free space optical add/drop multiplexer.

20 Claims, 7 Drawing Sheets

(51) Int. Cl.
*G02B 6/44* (2006.01)
*H04B 10/25* (2013.01)
*H04B 10/80* (2013.01)
*H04J 14/02* (2006.01)

(52) U.S. Cl.
CPC ............. *H04B 10/25* (2013.01); *H04B 10/80* (2013.01); *H04J 14/0202* (2013.01)

(58) Field of Classification Search
CPC .... G02B 6/29362; H04B 10/25; H04B 10/80; H04J 14/0202; H04J 14/0213; H04J 14/022; H04J 14/0201; H04J 14/02
See application file for complete search history.

(56) References Cited

U.S. PATENT DOCUMENTS

| | | | | |
|---|---|---|---|---|
| 4,679,250 | A * | 7/1987 | Davis | G02B 6/4448 165/80.3 |
| 4,757,157 | A * | 7/1988 | Pelet | H02G 15/14 174/50 |
| 4,761,831 | A * | 8/1988 | Davis | G02B 6/4448 174/70 S |
| 4,875,215 | A * | 10/1989 | Hughes | H01S 3/06754 372/6 |
| 4,962,445 | A * | 10/1990 | Pelet | H02G 15/14 165/185 |
| 6,198,857 | B1 * | 3/2001 | Grasis | G02B 6/29367 385/24 |
| 6,290,399 | B1 * | 9/2001 | Ogiya | G02B 6/4428 174/70 S |
| 6,381,394 | B1 * | 4/2002 | Cabrera | G02B 6/4448 359/341.1 |
| 6,534,712 | B1 * | 3/2003 | Pitrone | G02B 6/4428 174/70 S |
| 6,571,042 | B1 * | 5/2003 | Kordahi | G02B 6/4461 385/100 |
| 6,665,477 | B2 * | 12/2003 | Toth | G02B 6/3816 385/100 |
| 6,917,465 | B2 * | 7/2005 | Young | G02B 6/4428 359/333 |
| 6,950,229 | B2 * | 9/2005 | Young | G02B 6/4428 359/333 |
| 6,995,899 | B2 * | 2/2006 | Aronstam | G01D 5/353 359/333 |
| 7,058,305 | B2 * | 6/2006 | Horinouchi | H04B 10/806 324/519 |
| 7,068,419 | B2 * | 6/2006 | DeVincentis | H02G 15/14 359/333 |
| 7,116,910 | B1 * | 10/2006 | Presby | H04B 10/1149 398/118 |
| 7,436,584 | B2 * | 10/2008 | Young | G02B 6/4428 359/333 |
| 7,529,020 | B2 * | 5/2009 | DeVincentis | G02B 6/4428 359/333 |
| 9,236,942 | B1 * | 1/2016 | Roberds | H04B 10/291 |
| 10,365,434 | B2 * | 7/2019 | Wang | G02B 6/124 |
| 10,461,852 | B1 * | 10/2019 | Grubb | H04B 10/808 |
| 10,659,155 | B2 * | 5/2020 | Grubb | G02B 6/4427 |
| 11,054,576 | B2 * | 7/2021 | Wang | G01N 21/03 |
| 2001/0009599 | A1 * | 7/2001 | Kato | G02B 6/421 385/92 |
| 2003/0206688 | A1 * | 11/2003 | Hollars | G02B 6/29365 385/24 |
| 2004/0067014 | A1 * | 4/2004 | Hollars | G02B 6/29365 385/33 |
| 2004/0160663 | A1 * | 8/2004 | DeVincentis | G02B 6/4428 359/333 |
| 2004/0175092 | A1 * | 9/2004 | Young | G02B 6/4201 385/138 |
| 2004/0196529 | A1 * | 10/2004 | Young | G02B 6/4428 359/333 |
| 2005/0036751 | A1 * | 2/2005 | Young | G02B 6/4428 385/100 |
| 2005/0105164 | A1 * | 5/2005 | Young | H01S 3/06704 359/333 |
| 2005/0179988 | A1 * | 8/2005 | Young | G02B 6/4448 359/333 |
| 2005/0185257 | A1 * | 8/2005 | Young | G02B 6/4428 359/333 |
| 2005/0200943 | A1 * | 9/2005 | DeVincentis | G02B 6/4427 359/333 |
| 2010/0290786 | A1 * | 11/2010 | Abbott | H04J 14/0205 398/79 |
| 2011/0076017 | A1 * | 3/2011 | Midorikawa | H04J 14/0201 398/48 |
| 2012/0177362 | A1 * | 7/2012 | Zhang | H04B 10/0773 398/9 |
| 2016/0087726 | A1 * | 3/2016 | Roberds | G02B 6/3886 398/105 |
| 2016/0363728 | A1 * | 12/2016 | Wang | G01N 21/6486 |
| 2018/0054271 | A1 * | 2/2018 | Abe | H04J 14/0219 |
| 2020/0049882 | A1 * | 2/2020 | Wang | G02B 6/124 |
| 2020/0052788 | A1 * | 2/2020 | Grubb | H04B 10/07955 |
| 2020/0400889 | A1 * | 12/2020 | Kardos | H04J 14/0201 |
| 2021/0033788 | A1 * | 2/2021 | Wang | G02B 6/34 |
| 2021/0176055 | A1 * | 6/2021 | Rahman | G06N 10/00 |

FOREIGN PATENT DOCUMENTS

| | | |
|---|---|---|
| WO | 99/14879 A2 | 3/1999 |
| WO | 2005/037642 A2 | 4/2005 |
| WO | 2011/094501 A1 | 8/2011 |
| WO | 2017/093751 A1 | 6/2017 |

OTHER PUBLICATIONS

"Technical Insight: Bend-Sensitive Fibers", UJ Consortium, Aug. 2017, 1 page.
"UJ Key Technical Features", Universal Jointing Consortium, Nov. 2016, 3 pages.
Beeche, "What is meant by Universal Jointing?", Universal Jointing Consortium, Jun. 2012, 2 pages.
International Search Report dated Jul. 3, 2019 in connection with International Patent Application No. PCT/GB2019/050626, 4 pages.
Written Opinion of the International Searching Authority dated Jul. 3, 2019 in connection with International Patent Application No. PCT/GB2019/050626, 7 pages.

* cited by examiner

SUBMARINE OPTICAL SYSTEM WITH FREE SPACE OPTICAL ADD/DROP MULTIPLEXER

CROSS-REFERENCE TO RELATED APPLICATIONS AND PRIORITY CLAIM

This application claims priority as a continuation of International Patent Application No. PCT/GB2019/050626 filed on Mar. 6, 2019, which claims priority to United Kingdom Patent Application No. 1803543.6 filed on Mar. 6, 2018. Both of these applications are hereby incorporated by reference in their entirety.

TECHNICAL FIELD

The present invention relates to a submarine optical communications system and to a joint for a submarine optical communications system.

BACKGROUND

Branching units are units that connect three cables (e.g. three submarine cables). In general terms, a branching unit may provide a connection between a first location and second location, at the same time as connecting the first and second locations to a third location via a branch connection. Traffic between the first location and the second location is typically carried by a first range of wavelengths, and traffic to or from the third location (from either the first or second location) is carried by a second (different) range of wavelengths.

In general, it is desirable for branching units to be highly reliable, because recovering a branching unit for maintenance is made complicated and difficult by the three cables (and generally requires a complex marine operation). Complexity in a branching unit should therefore be kept to a minimum. It may also be desirable for a branching unit to provide flexibility in spectral allocation (e.g. the allocation of channels in a wavelength division multiplexed system) between each of the first, second and third locations, so that traffic through the branching unit can be more optimally allocated spectrum/channels.

In an optical add drop multiplexing (OADM) branching unit, traffic between the first location and the second location is again carried by a first range of wavelengths, and traffic to or from the third location (to or from the first or second location) is carried by a second (different) range of wavelengths. In an OADM branching unit, wavelength selective filters are used to divert (drop) only the second range of wavelengths to the third location from the first location. Wavelength selective filters may also be used to recombine (add) the second (or a different, third) range of wavelengths from the third location to the second location.

Where fixed wavelength filters are used (which is presently typical to avoid concerns over reliability, complexity, and power consumption required for reconfigurable arrangements) the operator is committed to a fixed wavelength allocation for the branch traffic to or from the third location. Given the difficulties in forecasting traffic, there have been efforts to provide greater flexibility without too much complexity (complexity tending to have the drawback of negatively impacting both reliability and cost). One approach has been to site the wavelength selective filters in a box between the branching unit and the third location. This means that filters can be replaced more readily without interfering with the branching unit, which may require a difficult marine operation. Although recovering such a box is also disruptive, it is a simpler operation than recovering a branching unit (where, by definition, at least three cables meet).

Often more than one branching unit is required for an optical communication system linking many locations. In order to ensure that a communication link can be maintained over its lifetime, redundant branching units may be provisioned when a system is commissioned, which may be kept ready for deployment (e.g. onshore) to replace a failed unit, should that be necessary. If each branching unit has the same configuration, this approach of provisioning redundancy may be more practical than if each branching unit has a unique configuration of OADM.

A solution to at least some of the above-mentioned problems is desired.

SUMMARY

According to a first aspect of the invention, there is provided a common component assembly for a cable joint for joining a first submarine optical cable and a second submarine optical cable, the common component assembly comprising: a first end face comprising a first opening and a first flange for connection to a first cable termination unit of an undersea optical cable joint; a second end face comprising a second opening and a second flange for connection to an outer housing of an undersea optical cable joint; a fiber tray connecting the first end face to the second end face; and an optical assembly connected to a first side of the fiber tray, the optical assembly comprising a free space optical add/drop multiplexer.

Housing a free space optical add/drop multiplexer in a cable joint in this way may make it cheaper and simpler to deploy subsea optical network infrastructure that is straightforward to maintain and reliable. In certain embodiments, a free space implementation for the add/drop multiplexer enables a very compact arrangement that can be accommodated within a common component assembly of a cable joint. In certain embodiments, a free space implementation for the add/drop multiplexer minimizes the number of fiber splices required to implement the add/drop multiplexer.

The cable joint may comprise a universal joint.

The optical assembly may have outer dimensions of less than 20 cm×10 cm×10 cm.

The exterior of the optical assembly may comprise a fiber bend limiter. The side of the fiber tray to which the optical assembly is attached can subsequently accommodate fiber storage, which may make installation more convenient.

The optical assembly may comprise a fiber guide configured to reduce fiber curvature on entry to the optical assembly.

The optical assembly may comprise an optical module configured to: drop a first subset of channels from an express optical fiber to a drop optical fiber; allow through transmission of a second subset of channels through the express optical fiber; and add the first subset of channels from an add optical fiber to the express optical fiber.

The optical module may comprise first, second, third and fourth filters, wherein: the first and second filters are each configured to transmit the second subset of channels and reflect the first subset of channels; the third and fourth filters are each configured to transmit the first subset of channels and reflect the second subset of channels.

The optical module may further comprise: a first reflector configured to direct light transmitted through the first filter to the second filter; and a second reflector configured to direct light transmitted through the third filter to the fourth filter.

The first filter may be configured to reflect light to the fourth filter. The second filter may be configured to reflect light to the third filter.

The optical module may further comprise: a first input port configured to direct light at the first reflector by transmission through the first filter; a second input port configured to direct light at the second reflector by transmission through the third filter; a first output port configured to receive light from the second reflector by transmission through the fourth filter; and a second output port configured to receive light from the first reflector by transmission through the second filter.

The optical assembly may comprise at least two optical modules, configured to add/drop signals from an eastward fiber to a first add/drop optical fiber pair, and to add/drop signals from a westward fiber to a second add/drop optical fiber pair.

The optical assembly may comprise fiber pigtails already coupled to each of the ports of the optical module.

According to a second aspect there is provided an optical system, comprising: a branching unit; and a cable joint and a first leg of optical cable connecting the cable joint to the branching unit; wherein the cable joint comprises a common component assembly according to the first aspect, and the first leg carries at least one express optical fiber, at least one drop optical fiber, and at least one add optical fiber.

BRIEF DESCRIPTION OF THE DRAWINGS

Embodiments of the invention will now be described, with reference to the accompanying drawings, in which.

Like reference numerals are used to indicate like elements in the drawings. The terms "west" and "east" herein are not intended to indicate geographic directions, but simply to distinguish conveniently between different directions of transmission.

DETAILED DESCRIPTION

Figure 1:
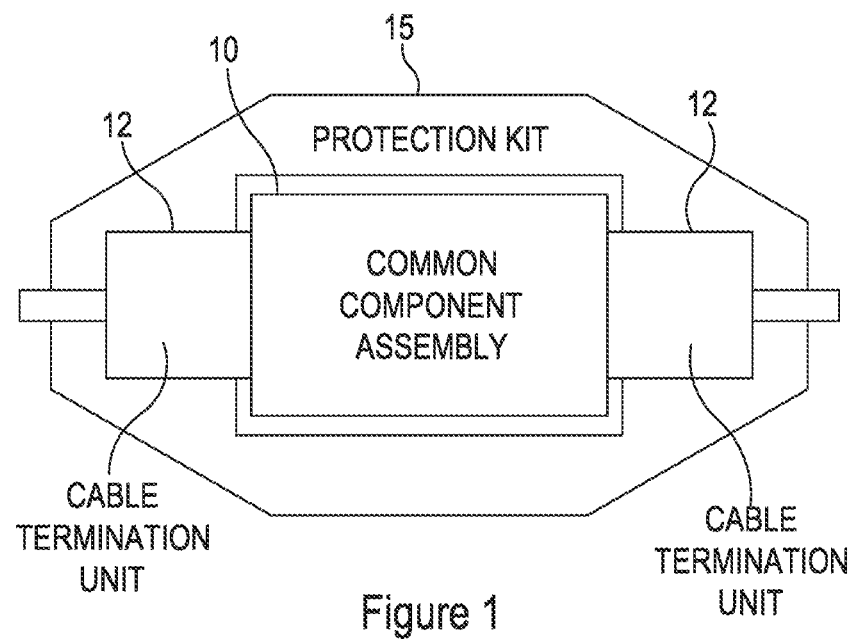
FIG. 1 is a schematic of a universal joint for connecting together optical cables.

FIG. 1 shows a simplified schematic diagram of a universal cable joint for jointing fiber optic cables for use in undersea optical telecommunication systems. Such a joint is referred to as a universal cable joint because it can interconnect many different types of undersea optical telecommunication cables, regardless of manufacturer. The cable joint includes a common component assembly 10 in which an optical fiber splice is located. The fiber splice is formed from two fibers that respectively originate in two cables that each terminate in cable termination units 12. A protective assembly 15 surrounds the common component assembly 10 and cable termination units 12 to provide protection from the external environment.

Figure 2:
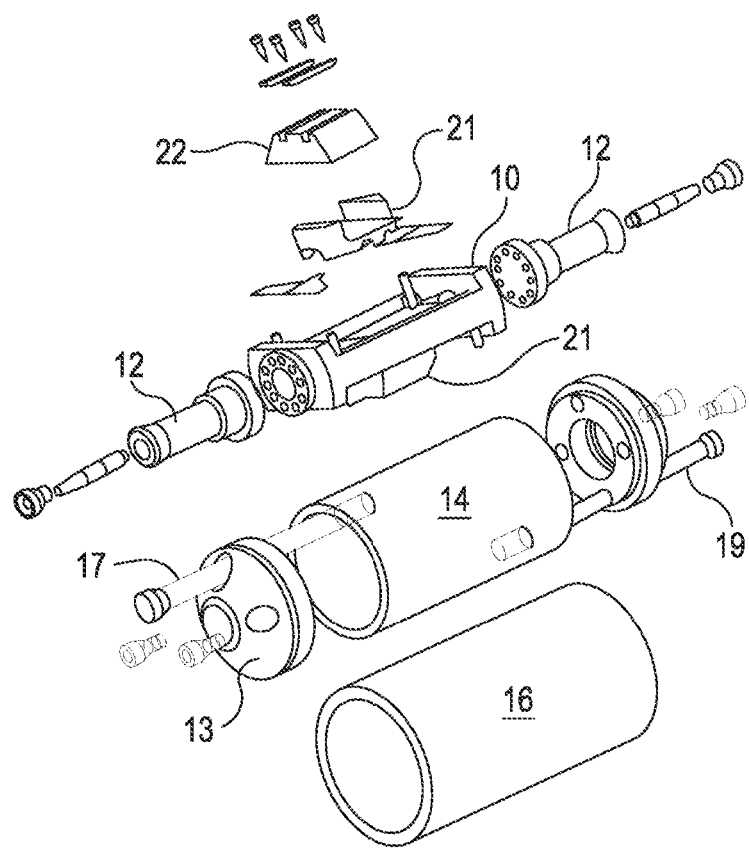
FIG. 2 is an exploded diagram of a universal joint.

FIG. 2 shows an example of a universal cable joint that is available from Global Marine Systems Limited and the Universal Joint Consortium, which is often simply referred to as the Universal Joint. The protective assembly 15 that was schematically illustrated in FIG. 1 comprises a stainless steel sleeve 14 that surrounds the common component assembly 10 and a polyethylene sleeve 16 that is molded over the common component assembly 10. The stainless steel sleeve 14 provides resistance to tensile, torsional and compressive loads and further may provide an electrically conductive path through which electrical power can be transmitted from a conductor of one cable to a conductor of the other.

A subsea optical cable may comprise a number of internal components. The jointing process begins by stripping back various layers of the cable to reveal predetermined lengths of the outer jacket, copper conductor, strandwires, and the fiber package (e.g. a buffer tube containing optical fibers or a kingwire surrounded by the optical fibers). The strandwires are clamped in a ferrule assembly located in the cable termination units 12. The fiber package extends into the common component assembly 10, where it is held in place by a series of clamps. In the common component assembly 10 the individual fibers are separated and spliced to their corresponding fibers from the other cable.

Figure 11:
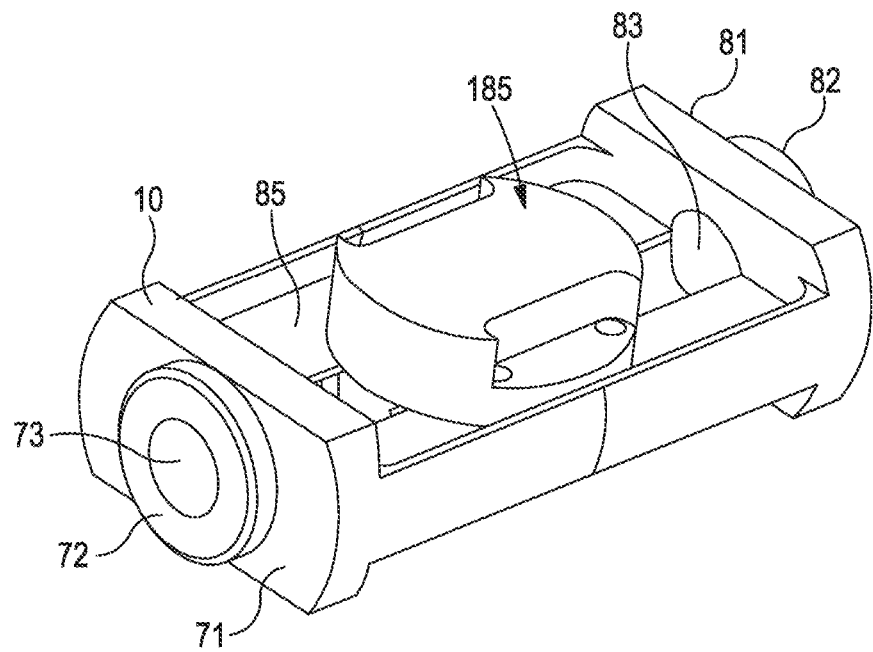
FIG. 11 is a schematic of the optical assembly of FIG. 8 installed in a common component assembly of a universal joint viewing a first side of the fiber tray.
Figure 12:
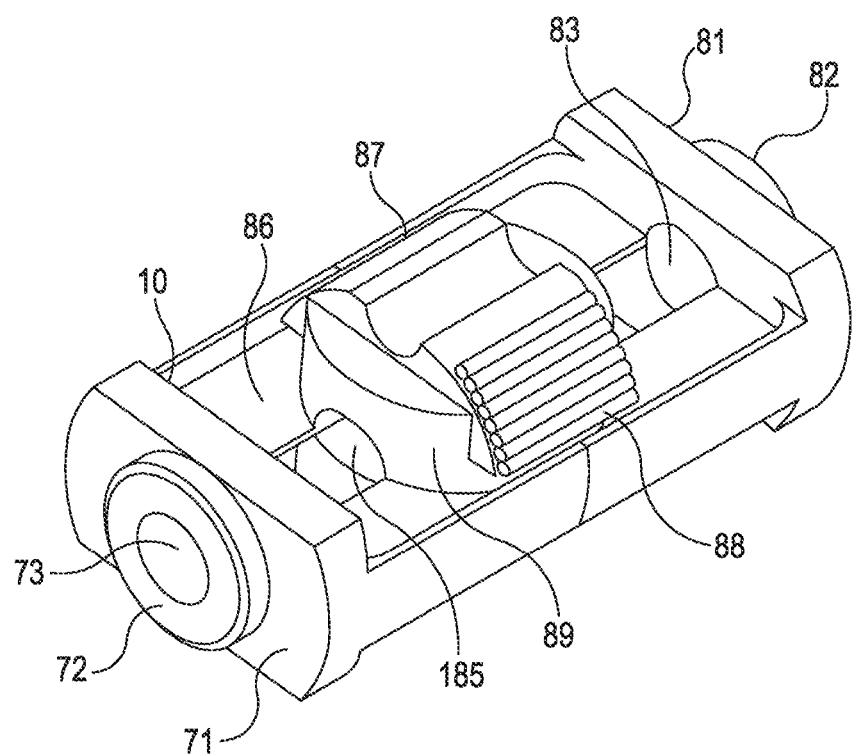
FIG. 12 is a schematic of the optical assembly of FIG. 8 installed in a common component assembly of a universal joint viewing a second side of the fiber tray.

As is more clearly shown in FIGS. 11 and 12, the common component assembly 10 comprises a first end face 71 comprising a first opening 73 through which the fiber package extends into the common component assembly 10, and a first flange 72 by which the adjacent cable termination unit 12 is attached to the common component assembly 10. The common component assembly 10 further comprises a second end face 81 comprising a second opening 83 through which the fiber package extends into the common component assembly 10, and a second flange 82 by which the adjacent cable termination unit 12 is attached to the common component assembly 10. A fiber tray 85 extends between the first and second end faces 71, 81.

Any excess fiber may be accommodated in the fiber tray of the common component assembly 100, looped around a bend limiter 21. Fiber splices may be retained within splice tubes, and secured to a mounting block 22 that forms part of a bend limiter 21 on one side of the fiber tray.

The common component assembly 10 is inserted in the stainless steel sleeve 14 and end caps 13 are screwed to each end of the assembly 10. Two tension rods 17 and 19 extend through the end caps 13 and the common component assembly 10. The tension rods 17 and 19 are designed to carry any tension loads that are placed on the universal joint during deployment (e.g. as the joint is transferred from a cable laying ship to the subsea environment).

Figure 3:
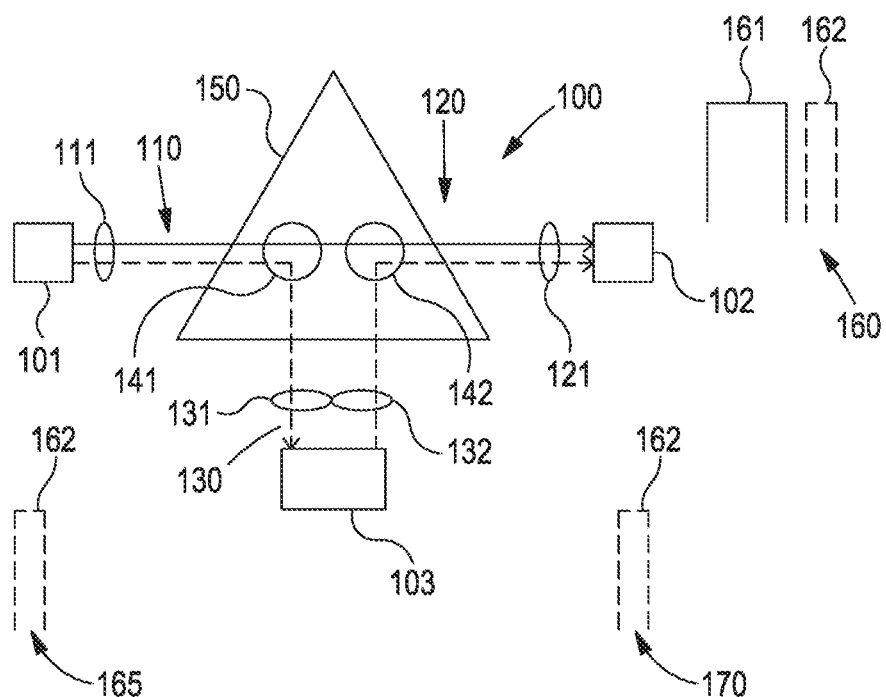
FIG. 3 is a schematic of an optical add-drop multiplexer (OADM) branching unit.

FIG. 3 schematically illustrates optical apparatus 100 comprising: a branching unit 150; first, second and third locations 101, 102, 103; and first, second and third cables 110, 120, 130.

The first cable 110, second cable 120 and third cable 130 respectively connect each of the first location 101, second location 102 and third location 103 to the branching unit 150.

Each of the first cable 110, second cable 120, and third cable 130 respectively comprise at least one optical fiber 111, 121 and 131, 132. Although a single fiber connection is depicted, it will be understood that any of the optical cables 110, 120, 130 may comprise a plurality of cables, connected by the branching unit 150. Furthermore, although only a single direction of communication is sometimes shown for simplicity, it will be appreciated that duplex communication is typically used (e.g. by fiber pairs).

The spectrum (channels) 165 received at the third location and the spectrum (channels) 170 transmitted from the third location are indicated, along with the spectrum 160 received at the second location 102.

The optical fiber 111 carries a first range of wavelengths (e.g. a set of at least one channel), indicated by a solid line 161, and a second range of wavelengths, indicated by a dashed line 162. The first range of wavelengths 161 are allocated for communication from the first location 101 to the second location 102. The second range of wavelengths 162 are allocated for communication from the first location 101 to the third location 103, and from the third location to the second location 102.

The branching unit is an optical add drop multiplexing (OADM) branching unit 150 and uses a "drop" filter 141 (a fixed wavelength selective filter) to route only the second range of wavelengths 162 carried by the optical fiber 111 of the first cable 110 to the optical fiber 131 of the third cable 130 (and thence to the third location 103). A further "add" filter 142 (a fixed wavelength selective filter) is used to add the second range of wavelengths back into the optical fiber 121 of the second optical cable 121 for communication from the third location 103 to the second location 102.

The fixed add/drop filters 141, 142 offer no flexibility, and the operator is committed to a fixed allocation of spectrum/channels for each communication route. Although reconfigurable add drop multiplexers (ROADM) arrangements are known, these add significant complexity and their reliability is not yet sufficiently well established for widespread adoption.

Given the difficulties of forecasting traffic over the lifetime of a communications system, there have been efforts to provide greater flexibility without too much complexity. One approach is to site the add/drop filters remotely from the branching unit, for instance in a box between the branching unit and the third location.

Figure 4:
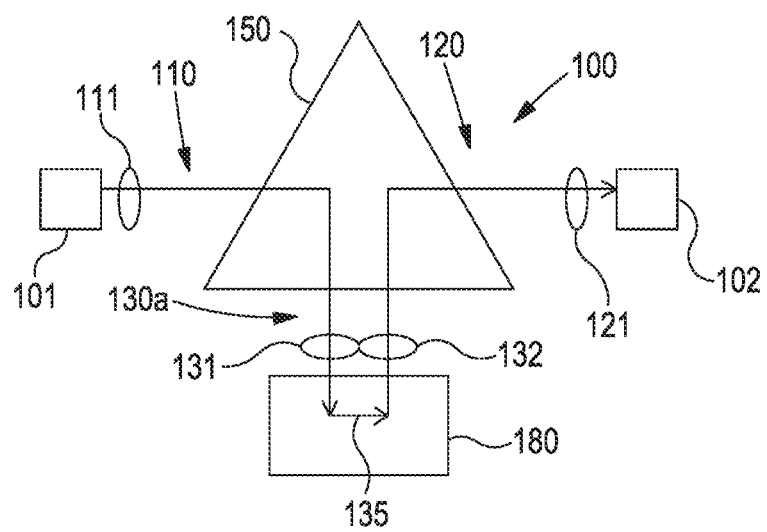
FIG. 4 is a schematic of a branching unit with a remote box comprising a loop connector.
Figure 5:
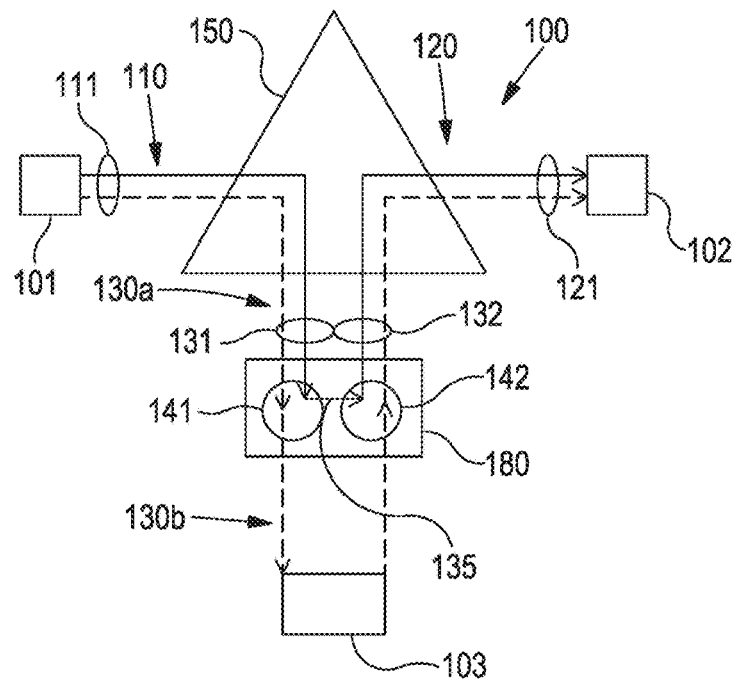
FIG. 5 is a schematic of a branching unit with a remote box comprising an OADM for making a branch connection.

FIGS. 4 and 5 illustrate this approach. In FIG. 4 a fiber-drop branching unit 150 is installed with a box 180, remote between the branching unit 150 and the third location 103 (not shown), so that a proximal portion 130a of the third optical cable links the branching unit 150 and the box 180. A loop connection 135 connects the optical fiber 111 of the first cable 110 to the optical fiber 121 of the second cable 120 via the branching unit 150.

As shown in FIG. 5, at a later time, the box 180 can be picked up, and the desired wavelength selective add/drop filters 141, 142 can be added to divert a preselected range of wavelengths from the proximal portion of the third cable 130a to a distal portion of the third optical cable 130b, so as to provide communication to and from a third location 103. Picking up the submarine box 180, which has only two connections, may be a simpler operation than picking up the branching unit 150, which has a minimum of three.

Figure 6:
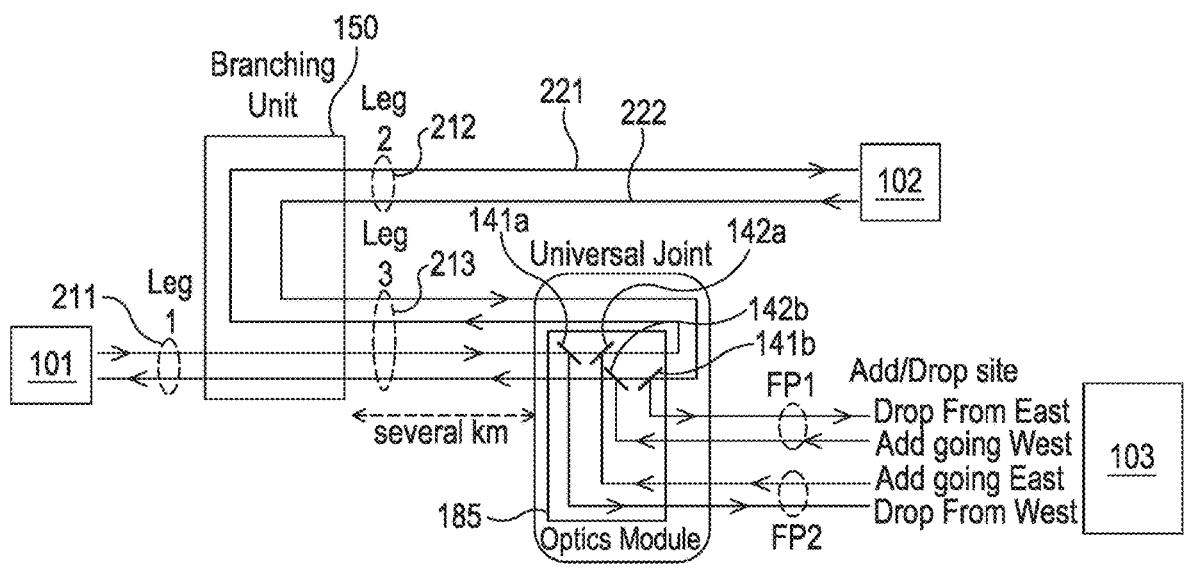
FIG. 6 is a schematic of an embodiment in which the OADM is provided in a universal joint.

FIG. 6 illustrates an alternative arrangement, in which an optics assembly 185 is positioned remote from a branching unit 150 that connects first, second and third locations 101, 102, 103. In this example, bi-directional fiber pairs are illustrated. The routing of a single fiber pair is illustrated for clarity, but it will be appreciated that more fiber pairs may be used.

In the example of FIG. 6, the universal joint with the optics module is placed between the third location 103 and the branching unit 150, but in other examples the optics module may be between the branching unit 150 and either of the first or second locations 101, 102.

In the example of FIG. 6, the first leg 211 running from the first location 101 to the branching unit 150 comprises a fiber pair comprising an eastward fiber 221 and westward fiber 222. A third leg 212 of optical cable connects the universal joint comprising the optical assembly 185 to the branching unit 150, and includes an outward run of the eastward and westward fiber and a return run of the eastward and westward fiber. The third leg 213 carries two fiber pairs. A second leg 212 of optical cable connects the branching unit 150 to the second location 102. The second leg 212 also comprises the eastward and westward optical fiber 221, 222.

Leading away from the universal joint is a cable comprising two fiber pairs: a first (FP1) carrying traffic dropped from and to be added to the eastward fiber 221 and a second (FP2) carrying traffic dropped from and to be added to the westward fiber 222.

The optics assembly 185 comprises wavelength selective filters 141a, 141b, 142a, 142b. First and second drop filters 141a, 141b are used to drop wavelength channels from the eastward and westward fiber respectively. First and second add filters 142a, 142b are used to add wavelength channels from the third location 103 to the eastward and westward channels 221, 222.

The optics assembly 185 is preferably placed within a cable joint housing, and may be positioned several kilometers away from the branching unit 150 (e.g. with a length of first leg 211 that allows the cable joint to be recovered to the surface without disturbing the branching unit).

Figure 7:
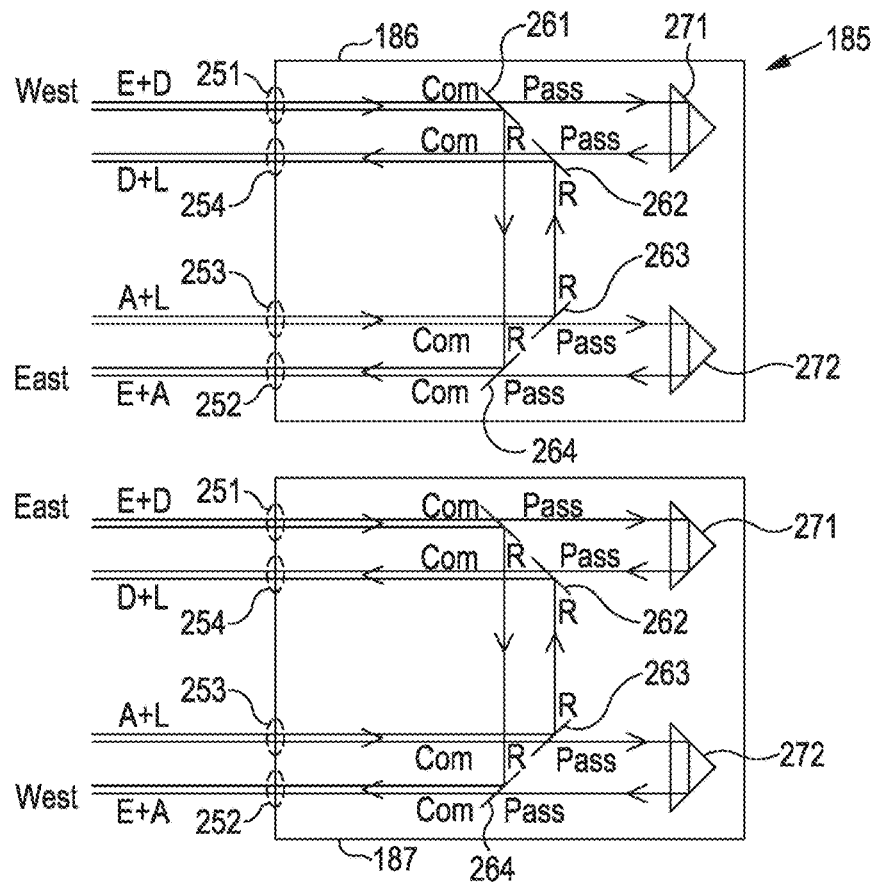
FIG. 7 is a schematic of the optical layout of OADM modules according to an embodiment.

FIG. 7 depicts an example embodiment of the optics assembly 185, in which the add/drop functionality is implemented in two modules using free space optics: each of the modules is a free space add/drop optical multiplexer. A module is provided for each add/drop fiber pair with a first input port and first output port for the fiber from which channels are dropped and added, and a second input and output port for the drop and add fiber pair. Fiber pigtails may be provided already coupled to the ports of each module, for splicing with optical fibers (e.g. of the third leg 213). The angles of incidence in FIG. 7 are not intended to be limiting, and different (e.g. more shallow) angles of incidence at the filters may be used in practice.

The light from the fibers is directed from the input fibers to the free space interior of the module, toward filters and reflecting elements, and then coupled back into the output fibers. Coupling lenses (e.g. graded refractive index lenses) may be used to collimate or focus light from input fibers into the free space module, and to couple beams of light back into the output fibers.

In the example of FIG. 7 a first module 186 and a second module 187 are shown.

The first module 186 comprises a first input port 251, first output port 252, second input port 253, second output port 254, first to fourth wavelength selective filters 261-264 and first and second reflectors 271, 272.

The eastward fiber (carrying communication from the first location 101) is coupled to the first input port 251 and to the first output port 252. The add and drop fibers of the first add/drop fiber pair FP1 are respectively coupled to the second input port 253 and the second output port 254. The filters 261-264 and reflectors are configured to drop (to carry communication to the third location 103) a subset of the channels communicating between the first and second location 101, 102, and then to add that subset of channels back to the same fiber (to carry communication from the third location 103). The subset of channels that is dropped and added may be referred to as the add/drop channels, and the subset of the channels that is not dropped or added may be referred to as the express channels. In the following the E and L channels both comprise the express channels and D and A channels both comprise the add/drop channels.

The eastward optical fiber at the first input port 251 carries E channels that carry information from the first location 101 to the second location 102 (without being dropped) and D channels that are dropped to communicate from the first location 101 to the third location 103.

The light from the eastward optical fiber at the first input port 251 is directed to the first wavelength selective filter 261 which is arranged to reflect the E channels and to allow the D channels to be transmitted through the first filter 261. After transmission through the first filter 216, the D channels are routed by the first reflector 271 to the second output port 254 via the second wavelength selective filter 262, which is configured to be transmissive for the D channels. The E channels that are reflected from the first filter 261 are directed to the fourth wavelength selective filter 264, which is configured to be reflective to the E channels and to reflect the E channels to the first output port 252.

The light from the add fiber of the add/drop fiber pair FP1 is input to the second input port 253, and comprises A channels to be added to the eastward optical fiber, and L channels. The L channels may optionally carry loading signals that may reduce spectral hole burning in the add/drop fiber pair.

The second input port 253 directs light to the third wavelength selective filter 263, which is configured to pass the A channels and reflect the L channels. The A channels are directed to a second reflector 272 which is configured to reflect the A channels to the first output port through the fourth wavelength selective filter 264. The reflected L channels are directed to the second filter 262, which is reflective for these channels, and configured to reflect them to the second output port.

The second module 187 in this example is substantially identical to the first module 186 in optical layout, but may use differently configured filters, for example so that the channels dropped from the eastward channel are different than the channels dropped from the westward channel (e.g. to reflect traffic/demand asymmetry in these links).

The second module 187 comprises a first input port 251, first output port 252, second input port 253, second output port 254, first to fourth wavelength selective filters 261-264 and first and second reflectors 271, 272.

The westward fiber (carrying communication from the second location 102) is coupled to the first input port 251 and to the first output port 252. The add and drop fibers of the second add/drop fiber pair FP2 are respectively coupled to the second input port 253 and the second output port 254.

The westward optical fiber at the first input port 251 carries E channels that carry information from the second location 102 to the first location 101 (without being dropped) and D channels that are dropped to communicate from the second location 102 to the third location 103.

The light from the add fiber of the add/drop fiber pair FP2 is input to the second input port 253, and comprises A channels to be added to the westward optical fiber, and L channels. The L channels may optionally carry loading signals that may reduce spectral hole burning in the add/drop fiber pair.

The routing of the E, D, A and L channels within the second module is as described with reference to the first module. The E+A channels are directed to the first output port 252 and the D+L channels are directed to the second output port 254.

Figure 8:
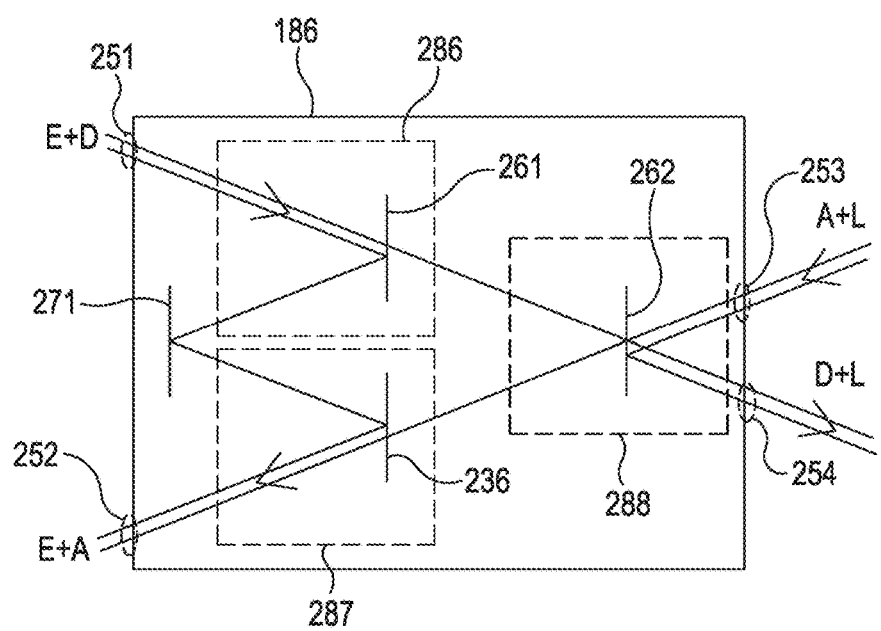
FIG. 8 is a schematic of an alternative OADM module according to an embodiment.

FIG. 8 shows an alternative embodiment of an optics module 186, similar to the optics modules shown in FIG. 7. The module 186 again has a first input port and first output port for the fiber from which channels are dropped and added, and a second input and output port for the drop and add fiber pair. Fiber pigtails may be provided already coupled to the ports of the module, for splicing with optical fibers.

The light from the fibers is directed from the input fibers to the free space interior of the module, toward filters and reflecting elements, and then coupled back into the output fibers. Coupling lenses (e.g. graded refractive index lenses) may be used to collimate or focus light from input fibers into the free space module, and to couple beams of light back into the output fibers.

The module of FIG. 8 first module 186 comprises a first input port 251, first output port 252, second input port 253, second output port 254, first to third wavelength selective filters 261-263 and a first reflector 271.

The ports 251-254 are as described with reference to FIG. 7, and the same fibers may be coupled thereto. The channels E, L, D and A are the same as described with reference to FIG. 7.

The light from the eastward optical fiber at the first input port 251 is directed to the first wavelength selective filter 261 which is arranged to reflect the E channels and to allow the D channels to be transmitted through the first filter 261. After transmission through the first filter 261, the D channels are routed to the second output port 254 via the second wavelength selective filter 262, which is configured to be transmissive for the D channels. The E channels that are reflected from the first filter 261 are directed by the first reflector 271 to the third wavelength selective filter 262, which is configured to be reflective to the E channels and to reflect the E channels to the first output port 252.

The light from the add fiber of the add/drop fiber pair FP1 is input to the second input port 253, and comprises A channels to be added to the eastward optical fiber, and L channels. The L channels may optionally carry loading signals that may reduce spectral hole burning in the add/drop fiber pair.

The second input port 253 directs light to the second wavelength selective filter 262, which is configured to pass the A (and D) channels and reflect the L (and E) channels. The A channels are directed to the first output port 252 through the third wavelength selective filter 263. The reflected L channels are directed to the second output port 254.

A second module similar to that shown in FIG. 8 may be provided, as described with reference to FIG. 7.

The arrangement of FIG. 8 may be advantageous over that of FIG. 7 in that it requires fewer wavelength selective filters.

As an alternative to an entirely free space implementation within module 186, the optics module 186 may be implemented in sub-modules 286, 287, 288. Each sub-module may be provided with a single wavelength selective filter, and a number of ports with fiber pigtails. Fiber splices may be used to join the pigtails of each sub-module: e.g. to replace the first reflector 271, to transmit the D channels from the first filter 261 to the second filter 262, and to transmit the A channels from the second filter 262 to the third filter 263. This implementation in sub-modules may be advantageous in reducing the optical path length that is to be implemented in free space optics, which may make the module performance less dependent on achieving stringent alignment tolerances.

Figure 9:
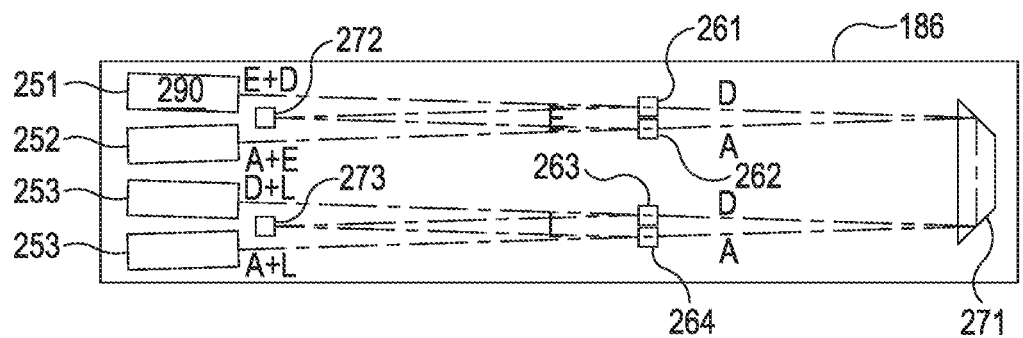
FIG. 9 is a schematic of a further alternative OADM module according to an embodiment.

FIG. 9 shows a further alternative embodiment of an optical module 186. The module 186 again has a first input port and first output port for the fiber from which channels are dropped and added, and a second input and output port for the drop and add fiber pair. Fiber pigtails may be provided already coupled to the ports of the module, for splicing with optical fibers.

The light from the fibers is directed from the input fibers to the free space interior of the module 186, toward filters and reflecting elements, and then coupled back into the output fibers. Coupling lenses 290 (e.g. graded refractive index lenses) may be used to collimate or focus light from input fibers into the free space module, and to couple beams of light back into the output fibers.

The module of FIG. 8 first module 186 comprises a first input port 251, first output port 252, second input port 253, second output port 254, first to fourth wavelength selective filters 261-264 and a first to third reflectors 271-273. The ports 251-254 are as described with reference to FIG. 7, and the same fibers may be coupled thereto. The channels E, L, D and A are the same as described with reference to FIG. 7.

The E+D channels from the eastward optical fiber at the first input port 251 are directed to the first wavelength selective filter 261 which is arranged to reflect the E channels and to allow the D channels to be transmitted through the first filter 261. After transmission through the first filter 261, the D channels are routed to the second output port 254 via first reflector 271 and the third wavelength selective filter 263, which is configured to be transmissive for the D channels. The E channels that are reflected from the first filter 261 are directed by the second reflector 272 to the second wavelength selective filter 262, which is configured to be reflective to the E channels and to reflect the E channels to the first output port 252.

The light from the add fiber of the add/drop fiber pair FP1 is input to the second input port 253, and comprises A channels to be added to the eastward optical fiber, and L channels. The L channels may optionally carry loading signals that may reduce spectral hole burning in the add/drop fiber pair.

The second input port 253 directs light to the fourth wavelength selective filter 264, which is configured to pass the A (and D) channels and reflect the L (and E) channels. The A channels are directed to the first output port 252 through the first reflector 271 and second wavelength selective filter 262. The reflected L channels are directed to the second output port 254 by the third reflector 273.

The length of the free space module shown in FIG. 9 may be from 80 to 120 mm, for example 100 mm. The width may be from 15 mm to 30 mm. The angle of incidence of light at each wavelength selective filter 261-264 may be less than 15 degrees, for example less than 5 degrees (3.6 degrees in the example shown).

An free space optical module (like that shown in FIG. 9 may be advantageous in that it may require the minimum number of fiber splices to install. Against this, free space implementations may be less tolerant of optical misalignment. The embodiment of FIG. 8 has at least two optical filters in each optical path (except the L path, which is less important), and therefore enables high levels of isolation to be provided between the A, D and E channels.

Figure 10:
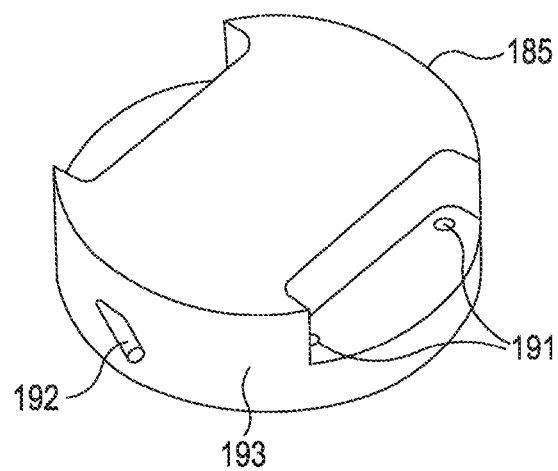
FIG. 10 is a schematic showing the exterior of an optical assembly comprising OADM modules according to an embodiment.

FIG. 10 shows an example package 181 of an optical assembly 185 according to an embodiment. The package 181 comprises a bend limiting profile 193, mounting holes 191 and a fiber guide 192, and the external shape is similar to a bend limiter in a standard universal joint. Optical fibers may be wrapped around the bend limiting profile 193, for storage in the common component assembly 10. Fasteners (e.g. screws) may secure the optical assembly 185 to the fiber tray of a common component assembly 10 through the mounting holes 191 (which correspond with the standard mounting locations for a bend limiter in a standard universal joint). The fiber guide 192 is angled in order to reduce curvature on a fiber entering the assembly from either side of the fiber tray.

FIG. 11 shows a common component assembly 10 (as described above) with an optical assembly 185 connected to a first side 85 of the fiber tray. The optical assembly 185 takes the place that a bend limiter would be located in a standard universal joint, and may include a mounting block configured to support fiber splices.

FIG. 12 shows the common component assembly 10 of FIG. 11 from the other side, with a bend limiter 89 and mounting block 87 connected to the second side 86 of the fiber tray. Eight fiber splices 88 are shown disposed on the mounting block 87, illustrating an example location for fiber splices to pigtails from the optical assembly 185. A standard common component assembly 10 is capable of accommodating 48 fiber splices on each mounting block 87, so there is more than enough room to accommodate a number of add/drop optical multiplexer modules (especially taking into account that a corresponding mounting block can be provided as part of the/each optical assembly 185.

Figure 13:
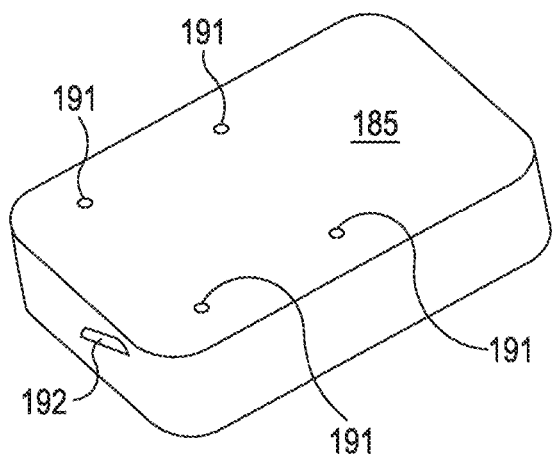
FIG. 13 is a schematic of an alternative configuration of an optical assembly according to an embodiment.
Figure 14:
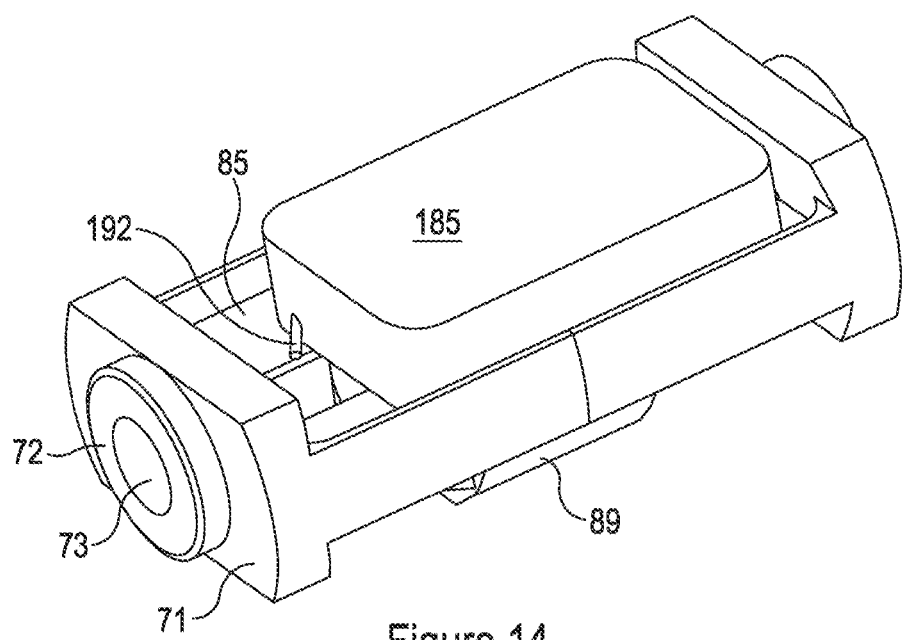
FIG. 14 is a schematic of the alternative configuration of optical assembly installed in a common component assembly of a universal joint.

Although it may be helpful that the optical assembly is similar in configuration to an existing bend limiter, this is not essential. FIGS. 13 and 14 illustrate an example configuration for the optical assembly 185 in which the optical assembly takes up more space on the first side 85 of the fiber tray, potentially precluding accommodating loops of fiber on that side of the tray. The angled fiber guide 192 is configured to reduce fiber curvature (i.e. bend radius) for a fiber entering the optical assembly from the other side of the fiber tray.

The examples provided above are not intended to limit the scope of the invention, which should be interpreted with reference to the accompanying claims.

What is claimed is:

1. A common component assembly for a cable joint for joining a first submarine optical cable and a second submarine optical cable, the assembly comprising:
    a first end face comprising a first opening and a first flange configured to be connected to a first cable termination unit of an undersea optical cable joint;

a second end face comprising a second opening and a second flange configured to be connected to a second cable termination unit of the undersea optical cable joint;

a fiber tray connecting the first end face to the second end face; and an optical assembly connected to a side of the fiber tray, the optical assembly comprising a free space optical add/drop multiplexer.

2. The common component assembly of claim 1, wherein the cable joint comprises a universal joint.

3. The common component assembly of claim 1, wherein the optical assembly has outer dimensions of less than 20 cm×10 cm×10 cm.

4. The common component assembly of claim 1, wherein an exterior of the optical assembly comprises a fiber bend limiter.

5. The common component assembly of claim 1, wherein the optical assembly comprises a fiber guide configured to reduce fiber curvature on entry to the optical assembly.

6. The common component assembly of claim 1, wherein the optical assembly comprises an optical module configured to:

drop a first subset of channels from an express optical fiber to a drop optical fiber;

allow through transmission of a second subset of channels through the express optical fiber; and add the first subset of channels from an add optical fiber to the express optical fiber.

7. The common component assembly of claim 6, wherein:

the optical module comprises first, second, third and fourth filters;

the first and second filters are each configured to transmit the second subset of channels and reflect the first subset of channels; and the third and fourth filters are each configured to transmit the first subset of channels and reflect the second subset of channels.

8. The common component assembly of claim 7, wherein:

the first filter is configured to reflect light to the fourth filter; and the second filter is configured to reflect light to the third filter.

9. The common component assembly of claim 7, wherein the optical module further comprises:

a first reflector configured to direct light transmitted through the first filter to the second filter; and a second reflector configured to direct light transmitted through the third filter to the fourth filter.

10. The common component assembly of claim 9, wherein the optical module further comprises:

a first input port configured to direct light at the first reflector by transmission through the first filter;

a second input port configured to direct light at the second reflector by transmission through the third filter;

a first output port configured to receive light from the second reflector by transmission through the fourth filter; and a second output port configured to receive light from the first reflector by transmission through the second filter.

11. The common component assembly of claim 10, wherein the optical assembly comprises fiber pigtails already coupled to each of the ports of the optical module.

12. The common component assembly of claim 6, wherein the optical assembly comprises at least two optical modules configured to:

add/drop signals from an eastward fiber to a first add/drop optical fiber pair; and add/drop signals from a westward fiber to a second add/drop optical fiber pair.

13. An optical system comprising:

a branching unit;

a cable joint; and a leg of optical cable connecting the cable joint to the branching unit;

wherein the cable joint comprises a common component assembly, the common component assembly comprising:

a first end face comprising a first opening and a first flange configured to be connected to a first cable termination unit of the cable joint;

a second end face comprising a second opening and a second flange configured to be connected to a second cable termination unit of the cable joint;

a fiber tray connecting the first end face to the second end face; and an optical assembly connected to a side of the fiber tray, the optical assembly comprising a free space optical add/drop multiplexer.

14. The optical system of claim 13, wherein the optical assembly comprises an optical module configured to:

drop a first subset of channels from an express optical fiber to a drop optical fiber;

allow through transmission of a second subset of channels through the express optical fiber; and add the first subset of channels from an add optical fiber to the express optical fiber.

15. The optical system of claim 14, wherein:

the optical module comprises first, second, third and fourth filters;

the first and second filters are each configured to transmit the second subset of channels and reflect the first subset of channels; and the third and fourth filters are each configured to transmit the first subset of channels and reflect the second subset of channels.

16. The optical system of claim 15, wherein:

the first filter is configured to reflect light to the fourth filter; and the second filter is configured to reflect light to the third filter.

17. The optical system of claim 15, wherein the optical module further comprises:

a first reflector configured to direct light transmitted through the first filter to the second filter; and a second reflector configured to direct light transmitted through the third filter to the fourth filter.

18. The optical system of claim 17, wherein the optical module further comprises:

a first input port configured to direct light at the first reflector by transmission through the first filter;

a second input port configured to direct light at the second reflector by transmission through the third filter;

a first output port configured to receive light from the second reflector by transmission through the fourth filter; and a second output port configured to receive light from the first reflector by transmission through the second filter.

19. The optical system of claim 18, wherein the optical assembly comprises fiber pigtails already coupled to each of the ports of the optical module.

20. The optical system of claim 13, wherein the optical assembly comprises at least two optical modules configured to:
- add/drop signals from an eastward fiber to a first add/drop optical fiber pair; and
- add/drop signals from a westward fiber to a second add/drop optical fiber pair.

* * * * *